United States Patent [19]

Nakamura

[11] Patent Number: 4,806,926

[45] Date of Patent: Feb. 21, 1989

[54] ANTITHEFT DEVICE FOR AN AUDIO DEVICE

[75] Inventor: Takayuki Nakamura, Tokyo, Japan

[73] Assignee: Clarion Co., Ltd., Tokyo, Japan

[21] Appl. No.: 923,296

[22] Filed: Oct. 27, 1986

[30] Foreign Application Priority Data

Nov. 1, 1985 [JP] Japan ............................... 60-245360

[51] Int. Cl.$^4$ ............................................... G06F 7/04

[52] U.S. Cl. ................................ 340/825.31; 340/571

[58] Field of Search ............. 340/571, 691, 63, 825.31

[56] References Cited

U.S. PATENT DOCUMENTS 4,103,289 7/1978 Kolber ............................ 340/571 X 4,437,153 3/1984 Kamiyama et al. ................... 340/63

4,494,114 1/1985 Kaish .............................. 340/825.31

4,604,708 8/1986 Lewis .......................... 340/825.31 X 4,683,462 7/1987 Takeda et al. ...................... 340/571

4,720,700 1/1988 Seibold et al. .................... 340/63 X

*Primary Examiner*—Glen R. Swann, III

*Assistant Examiner*—Thomas J. Mullen, Jr.

*Attorney, Agent, or Firm*—Wallenstein, Wagner, Hattis & Strampel, Ltd.

[57] ABSTRACT

Diodes are used for memorizing an identification number. A microcomputer judges a combination of diodes and decides an identification number corresponding to that combination. The microcomputer is connected directly to a battery. Whether the audio device provided with an antitheft device according to this invention is stolen or not is judged, depending on whether it is connected without interruption to the battery or not. It is judged that the device is stolen, only when the battery has been once disconnected, and in this case the microcomputer doesn't allow the audio device to work, unless the identification number is newly inputted.

2 Claims, 2 Drawing Sheets

ANTITHEFT DEVICE FOR AN AUDIO DEVICE

FIELD OF THE INVENTION

This invention relates to an antitheft device for an audio device for use on vehicle, provided with code setting means for setting an antitheft code, code inputting means, and a microcomputer for comparison and control comparing an inputted code with a predetermined code.

BACKGROUND OF THE INVENTION

Heretofore an antitheft device for an audio device is known, in which a microcomputer is used for the antitheft purpose, in the memory of which an identification number is stored; the identification number should be inputted in order to use the audio device; and various functions of the audio device can work, only when an inputted code is in accordance with the stored identification number. That is, even if somebody steals the audio device, unless he knows the identification number, he cannot operate the audio device and therefore the device has an antitheft effect.

An antitheft device for an audio device for use on vehicle has been disclosed in Japanese patent application No. Sho-60-104434. This device has an inconvenience that a code representing the identification number must be inputted necessarily before use.

Further this device has a drawback that if its power supply feeding the microcomputer with electric power is switched off, no identification number can be identified, because the content of its memory is not held.

OBJECT OF THE INVENTION

The object of this invention is to provide an antitheft device for an audio device for use on vehicle, in which the content of the memory is held so that no code input is needed every time before the audio device is used, even if its power supply has been once switched off.

SUMMARY OF THE INVENTION

In order to achieve this object, an antitheft device for an audio device for use on vehicle according to this invention comprises a microcomputer connected to a backup power supply and having an ROM incorporating antitheft processing programs and so forth; code setting means for setting an antitheft code; code inputting means controlled by the microcomputer so that it gives only a code coming from the code setting means, which is in accordance with an predetermined identification number, to the microcomputer; and an audio device controlled by the microcomputer so that audio signal output is turned off, when it is judged that the backup power supply has been once disconnected.

Since diode switches are used for the memory of the identification number, the content of the memory doesn't disappear, even if the power supply is switched off. Further, the backup power supply is used for judging whether the audio device is stolen or not. In the case where the backup power supply has been once interrupted, it is judged that the audio device is stolen and only in this case the code input is needed for operating the audio device.

DETAILED DESCRIPTION

Figure 1:
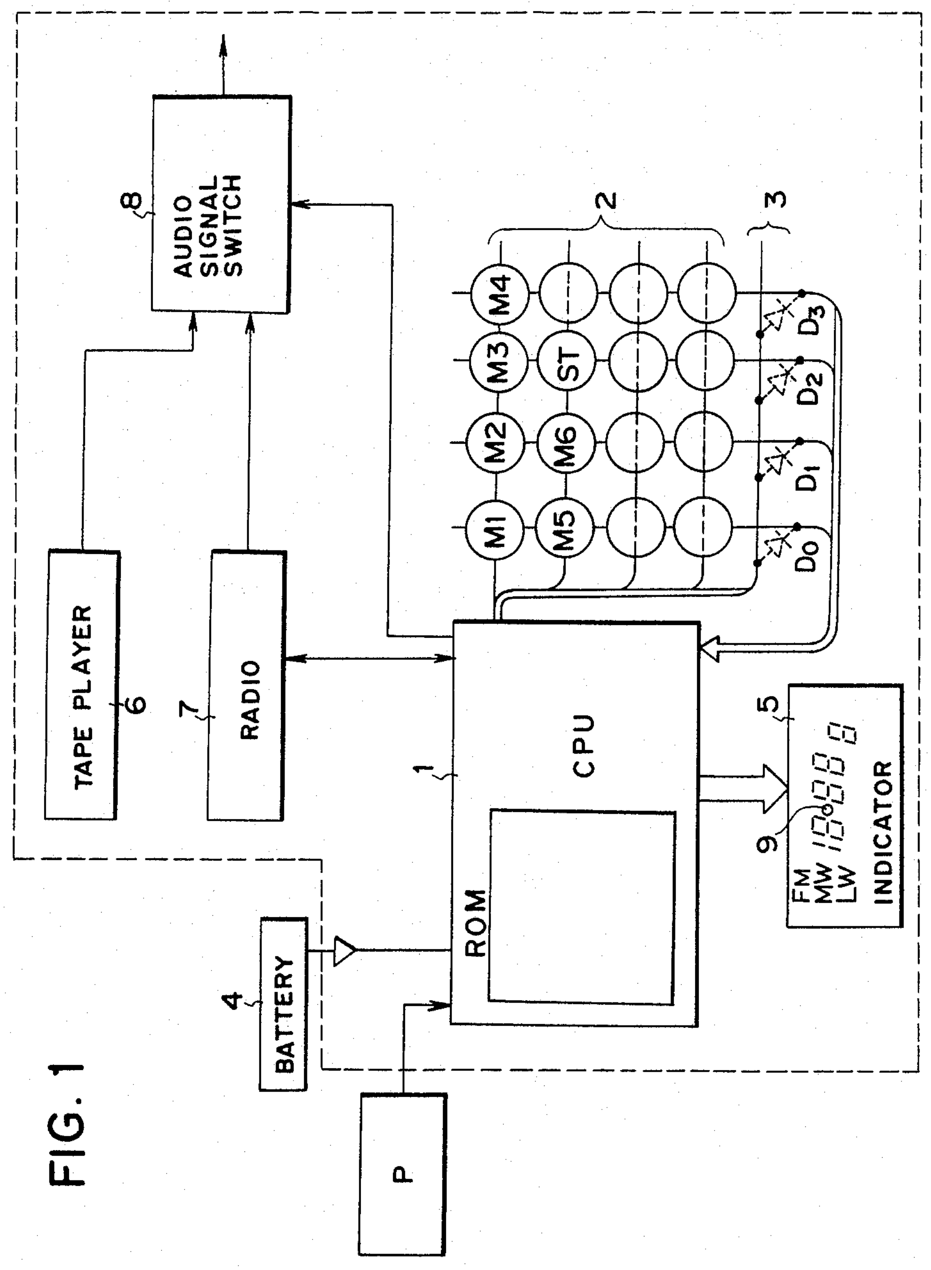
FIG. 1 is a block diagram illustrating the construction of an antitheft device for an audio device for use on vehicle according to this invention.

Hereinbelow this invention will be explained, using some preferred embodiments and referring to the drawings. However it should be understood that they are only examples and that there are various modifications and ameliorations without departing from the scope of this invention.

FIG. 1 is a block diagram illustrating the construction of an antitheft device for an audio device for use on vehicle according to this invention, in which the reference numeral 1 represents a microcomputer ( CPU ), 2 an antitheft code setting portion using operation keys, 3 a code inputting portion consisting of diodes, 4 a battery serving as a backup power supply for the microcomputer, 5 an input code indicator, 6 a tape player, 7 a radio circuit, 8 an audio signal changeover switch, and 9 light emitting diodes ( LED ). The microcomputer 1 incorporates antitheft processing programs, in its ROM and further is fed with electric power by a backup power supply, such as a battery 4, e.g. battery mounted on the vehicle.

The device indicated in FIG. 1 works as follows.

When the power supply other than the battery 4, e.g. the power supply Acc in the vehicle is switched on, the microcomputer 1 judges whether the backup power supply 4 is connected or not. In the case where the backup power supply 4 is connected without interruption during a period of time where the main power supply P is switched off, the microcomputer 1 judges that the audio device has not been stolen and operates a changeover switch 8 so that audio signals coming from a radio or a tape player are reproduced. In the case where it judges that the backup power supply 4 has been once disconnected, all the figures in the indicator rest to be turned off; the radio circuit 7 doesn't work; and the changeover switch 8 is set to the radio so that no sound can be heard. In this way, after the audio device has been stolen, it cannot be utilized efficaciously. In this case, the device cannot be operated without inputting a predetermined identification number.

The identification number is e.g. a four digit number, which is one of combinations of the figures from 1 to 6 formed by means of keys M1 to M6. Each of four digit identification numbers are determined by means of diode switches in the code input portion 3. For example, the identification number formed, controlled by the microcomputer 1, in the state where only a diode $D_0$ is connected and the other diodes $D_1 \sim D_3$ are not connected, is "2431".

The code "2431" obtained by pushing keys in the order M2→M4→M3→M1 is given to the microcomputer through the diode $D_0$ and the figures "2", "4", "3" and "1" in the indicator 5 are successively illuminated by the microcomputer 1. Since the code which is in accordance with the identification number has been inputted, the microcomputer 1 displays the usual radio indication in the indicator 5 and puts the radio device or the tape player in its active state.

If the inputted code is erroneous, e.g. when the ST key is pushed longer than 3 seconds after the termination of the input, all the figures in the indicator 5 are extinguished and it becomes possible to input again another code.

In order to let 1 know that the audio device is provided with an antitheft device, it is so constructed that the microcomputer 1 turns an LED 9 disposed behind the indicator 5 on-and-off. In order to stop this on-and-off of the LED 9, e.g. the ST key is pushed longer than 2 seconds. Then the microcomputer 1 recognizes it and extinguishes the LED 9.

Although in the above the case where an ST key is used is described, the operation key is not restricted to the ST key, but it is a matter of course that any other key can be utilized therefor, if it is a key which is nothing to do with the operation which is being carried out at that time. Which key is used depends on the program incorporated in the microcomputer.

Figure 2:
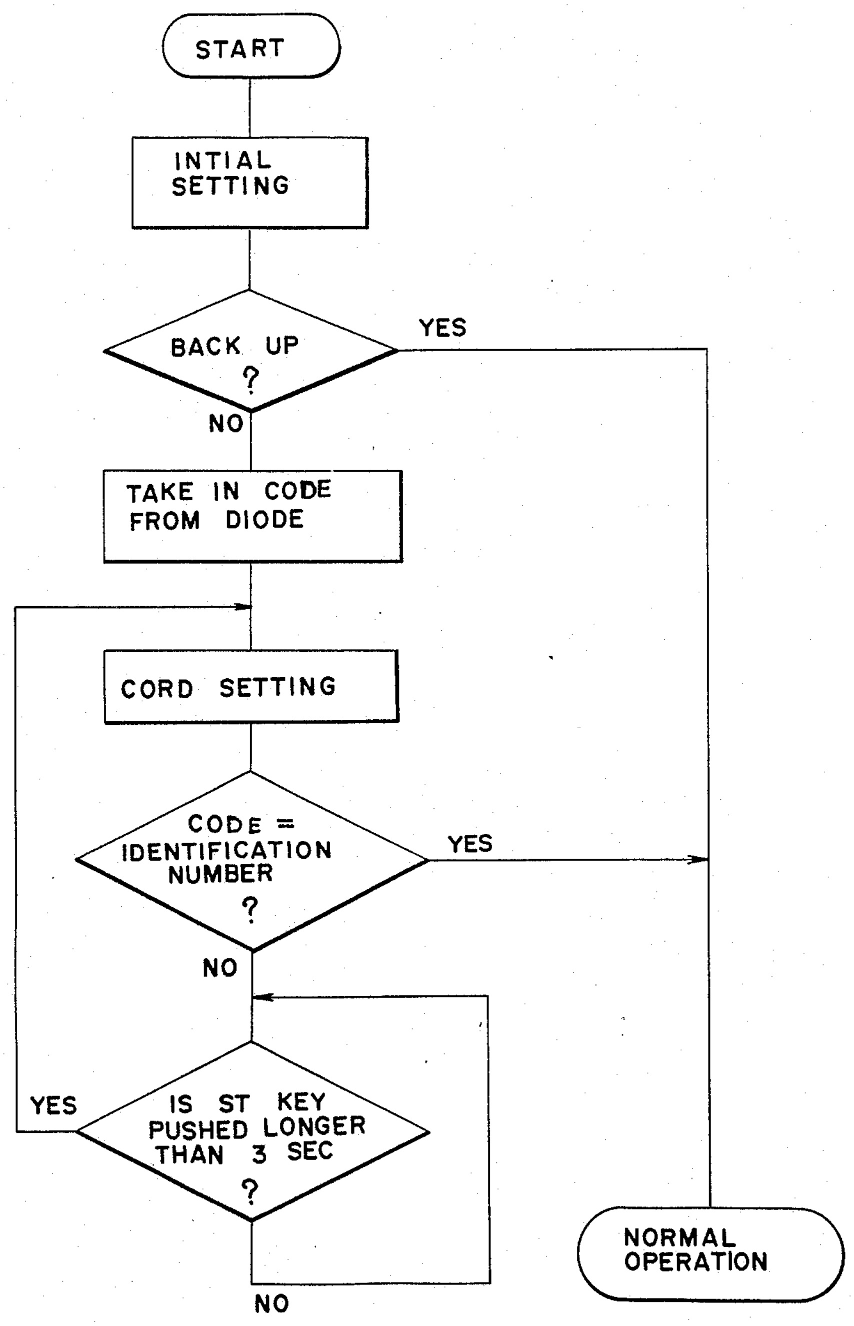
FIG. 2 is a flow chart for explaining the working mode of the antitheft device for an audio device for use on vehicle according to this invention.

FIG. 2 is a flow chart summarizing the operations described above. In the step "INITIAL SETTING" the initial setting of the indicator and the control signal is effected. In the step "BACKUP ?" it is judged whether the backup source has been connected without interruption during a period of time where the power source switch has been switched off. In the step "TAKE-IN CODE FROM DIODE" an identification number is determined by turning predetermined diodes on and off. Further in the step "CODE=IDENTIFICATION NUMBER ?" the inputted code is compared with the identification number.

As explained above, according to this invention, since diodes are used for the memory of the identification number, the content of the memory is not erased, even if the power supply is disconnected. Furthermore, since a backup power supply is used for judging whether the audio device is stolen or not and only when the backup power supply is disconnected, it is judged that the audio device is stolen, the code input is required only in this case.

The embodiments of the invention in which an exclusive property or privilege is claimed are defined as follows:

1. An antitheft apparatus for an audio signal processing apparatus comprising:

a microprocessor operating according to an antitheft program stored therein and including volatile memory storage;

disabling means operable between an enabling and a disabling condition and responsive to enabling and disabling signal conditions from said microprocessor for enabling and disabling audio output from said audio signal processing apparatus;

power supply means for providing power to said audio signal processing apparatus and including a power supply remote from said microprocessor and connected thereto by interconnection cabling for providing continuous power to said microprocessor so long as said interconnection is not broken;

code setting means external to and connected to said microprocessor and containing a non-volatile stored digital antitheft code for providing said antitheft code to said microprocessor;

user-operated code inputting means for providing to said microprocessor a user-entered digital code;

said antitheft program including the steps of reading said antitheft code from said code setting means into said volatile memory and comparing said code in volatile memory with a subsequently received user-entered code, operating and maintaining said disabling means to said enabling condition responsively to a match between said user-entered code and said code stored in volatile memory, said microprocessor having associated therewith means responsive to disconnection of said power supply from said microprocessor for operating said disabling means to said disabled condition during the period subsequent to reconnection of said power supply and until re-entry through said code inputting means of a code matching said antitheft code.

2. The antitheft apparatus of claim 1 further including at least one user-operated key switch connected to a microprocessor, said antitheft program being adapted to prevent operation of said disabling means to said enabling condition responsively to a mismatch between said code in volatile memory and a user-entered code and to continue to prevent operation of said disabling means to said enabling condition irrespective of subsequent entry of user-entered codes until said key switch is operated followed in sequence by entry of said matching code.

* * * * *